UNITED STATES PATENT OFFICE.

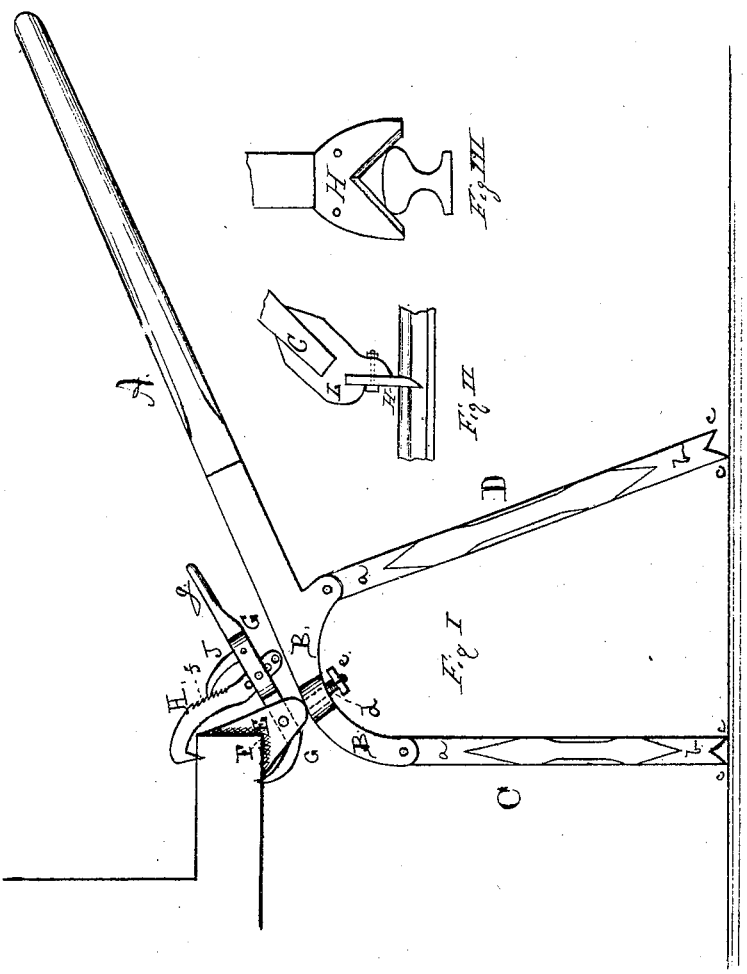

SAMUEL BECKER AND PETER LOUCKS, OF YORK, PENNSYLVANIA.

IMPROVEMENT IN CAR-MOVERS.

Specification forming part of Letters Patent No. 102,357, dated April 26, 1870.

*To all whom it may concern:*

Be it known that we, S. BECKER and P. LOUCKS, both of York, in the county of York and State of Pennsylvania, have invented a new and useful Improvement in Car-Movers; and we do hereby declare the following to be a clear and exact description of the nature thereof, sufficient to enable others skilled in the art to which our invention appertains to fully understand and use the same, reference being had to the accompanying drawings, making part of this specification.

Our invention consists in an improvement in the class of devices for moving cars, as will be hereinafter more fully described.

Figure 1 is a side view of our improved car-mover, showing it attached to the platform of a car. Fig. 2 is a side and Fig. 3 a back view of our improved gripping-foot.

In the drawings, A represents a lever, to the end of which is secured a head, B, which, for a certain portion of its length, is arched in order to afford great strength for the immense strain or weight brought to bear upon it. To the lower portions or ends of the arch there are pivoted two legs, C and D, of unequal lengths, and of which the front leg is the shorter. These legs may be made of metal, or, as in the present case, of wood, re-enforced at top and bottom by metallic pieces $a$ $b$. The bottom pieces, $b$, are formed with prongs $c$, which may be of different dimensions, whereby the legs will take firm hold of the ground or rail, whether in a perpendicular or angular position, since they occupy such positions during manipulation; or they may be of the form shown in Figs. 2 and 3, which are designed to travel on the track, and consists of forming the feet L with a socket, or other suitable arrangement for attaching them to the walking-levers C D.

Firmly secured by bolts, or formed with the feet L, are V-shaped biting-edged knives H. These knives straddle the rail, and, as they have sharp edges, they bite alternately, one gripping the rail, while the other slides forward, as the lever A is raised and depressed by the operator.

To the head B of the lever there is swiveled a jaw, E, which consists of a block having a transverse notch, F, of angular or V form, and a threaded shank, $d$, which passes through an opening in the head B, and is retained in place by a screw-nut, $e$. The jaw may be cast with or rigidly connected to the head B, but this construction not being so convenient, in order to apply the jaw to the car, we prefer to swivel the jaw to the head.

To the jaw E is pivoted an arm, G, whose forward end projects beyond the front of the jaw E, and is curved upward. The rear portion of said arm G projects beyond the back of the jaw, and has pivoted to it a dog, H, which extends upward, and its hooked end points in the direction of curved end of the arm G. The back of the dog is notched, as at $f$, said notches being engaged by a pawl, J, pivoted to the arm G. The arm G may be continued into a handle, $g$, for ready manipulation of the dog. The dog is formed with openings whereby it may be adjusted to different bumpers.

The operation is as follows: The notched jaw E is brought up against the bumper of a car, and dog H swung over the top thereof. The arm G is now drawn down, as to clamp the bumper on the jaw E. It will be seen that, when the dog is drawn down to its full extent and the pawl engaged with the notches in its back, the curved portion of the arm G is brought up against the under side of the bumper, whereby said bumper is firmly held in place on the jaw E. The curved portion of the arm and the dog act relatively to each other; the firmer the hold of one the greater will be the hold of the other. One motion of the handle end of the arm G will engage and disengage said clamping devices. The car is now pushed or moved by "walking" the legs, their operation being alternate. When the lever is raised, the front or shortest leg is the fulcrum, and when said lever is lowered the rear or longest leg is the fulcrum.

Power is communicated to the car by both operations of the lever, so that there is no lost motion. Were the legs of equal lengths, the tendency of the lever would be to raise the car, and not push it, and the walking of said legs could scarcely be performed.

By the peculiar construction of parts we are enabled to propel the car by both up and down strokes of the lever.

The device can travel either between or at the outer sides of the rails, or directly upon the rails, the latter of which we prefer, and can be quickly and firmly applied in any position, as well as be readily detached therefrom.

In some cases we may attach more than two legs to the head of the lever.

The mover may be accommodated to high or low cars by making the legs of corresponding heights.

In the above we have produced a simple and practical device.

Having thus described our invention, what we claim as new, and desire to secure by Letters Patent, is—

1. The curved or bent arm G, dog H, pawl J, serrated jaw E, when combined with the arched head B of the lever A and walking-legs C D, substantially as shown and described.

2. The walking-legs C D, made of unequal length, and provided with the feet L, having sharp-edged biting-knives H, when combined with the arched head B of the lever A, and serrated jaw E, swiveled thereto, arm G, dog H, and pawl J, all constructed substantially as shown and described.

3. The hinged arm G, curved at its forward end, and having pivoted to it the serrated dog H and pawl J, in combination with the notched jaw E, substantially as and for the purpose described.

4. The dog H, pivoted to the arm G and made adjustable, for the purpose described.

The above signed by us this 19th day of November, 1869.

SAMUEL BECKER.
PETER LOUCKS.

Witnesses:
GEORGE M. SHETTER,
G. D. SCHALL.